US012607982B2

(12) United States Patent
North et al.

(10) Patent No.: US 12,607,982 B2
(45) Date of Patent: Apr. 21, 2026

(54) SYSTEMS AND METHODS FOR SMART POWER AND FAN SPEED CONTROL

(71) Applicant: Dell Products, L.P., Round Rock, TX (US)

(72) Inventors: Travis C. North, Cedar Park, TX (US); Suraj M Varma, Portland, OR (US); Daniel L. Hamlin, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 430 days.

(21) Appl. No.: 18/158,933

(22) Filed: Jan. 24, 2023

(65) Prior Publication Data

US 2024/0248456 A1     Jul. 25, 2024

(51) Int. Cl.
*G05B 19/4155*     (2006.01)

(52) U.S. Cl.
CPC .................... *G05B 19/4155* (2013.01); *G05B 2219/49216* (2013.01)

(58) Field of Classification Search
None
See application file for complete search history.

(56) References Cited

U.S. PATENT DOCUMENTS

| | | | | |
|---|---|---|---|---|
| 8,395,898 | B1 * | 3/2013 | Chamseddine | F28D 7/0075 |
| | | | | 361/695 |
| 2006/0016901 | A1 * | 1/2006 | Beitelmal | H05K 7/20209 |
| | | | | 236/49.3 |

| | | | | |
|---|---|---|---|---|
| 2006/0032250 | A1 * | 2/2006 | Flanigan | G05D 23/1905 |
| | | | | 62/157 |
| 2007/0288191 | A1 * | 12/2007 | Schulke | G06F 11/3093 |
| | | | | 702/130 |
| 2014/0032011 | A1 * | 1/2014 | Artman | G06F 9/44505 |
| | | | | 700/300 |

(Continued)

FOREIGN PATENT DOCUMENTS

TW          201122234 A  *  7/2011

OTHER PUBLICATIONS

AMD, "CPU Thermal Management", Aug. 1995, Application Notes, pp. 2 (Year: 1995).*

(Continued)

*Primary Examiner* — David Earl Ogg
(74) *Attorney, Agent, or Firm* — Fogarty LLP

(57) ABSTRACT

Systems and methods for smart power and fan speed control are described. In an illustrative, non-limiting embodiment, an Information Handling System (IHS) may include: a processor; and an embedded controller (EC) coupled to the processor, where the EC is configured to control an operating aspect of a cooling fan based upon a heat rejection or dissipation of a heatsink coupled to the processor. In some other embodiments, a method can include calculating a heat rejection or dissipation of a heatsink coupled to a heat producing component of an IHS by determining a difference between a heatsink temperature and an ambient temperature, and: (i) dividing the difference by a thermal resistance of the heatsink, or (ii) multiplying the difference by a thermal conductance of the heatsink; and adjusting a rotation speed of a fan configured to cool the heat producing component based upon the calculation.

19 Claims, 4 Drawing Sheets

(56) References Cited

U.S. PATENT DOCUMENTS

| | | | |
|---|---|---|---|
| 2016/0147270 A1* | 5/2016 | Artman | G06F 1/206 |
| | | | 361/679.48 |
| 2016/0274629 A1* | 9/2016 | Lovicott | G06F 1/206 |
| 2017/0168531 A1* | 6/2017 | Casparian | G06F 1/206 |
| 2020/0089292 A1* | 3/2020 | North | G06F 1/206 |

OTHER PUBLICATIONS

Cheever, "Thermal Systems", 2014, Swarthmore College, pp. 2-5
(Year: 2014).*

* cited by examiner

300

301 — MEASURE THE HEATSINK TEMPERATURE

302 — MEASURE THE AMBIENT TEMPERATURE

303 — RETRIEVE THE THERMAL RESISTANCE (OR CONDUCTANCE) OF THE HEATSINK

304 — CALCULATE THE HEAT REJECTION OR DISSIPATION OF THE HEATSINK

305 — THRESHOLD MET ?

NO

YES

306 — CONTROL THE ON/OFF STATUS, ROTATION SPEED, LOUDNESS, AND/OR OTHER OPERATING ASPECT OF A COOLING FAN

SYSTEMS AND METHODS FOR SMART POWER AND FAN SPEED CONTROL

FIELD

This disclosure relates generally to Information Handling Systems (IHSs), and more specifically, to systems and methods for smart power and fan speed control.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

SUMMARY

Systems and methods for smart power and fan speed control are described. In an illustrative, non-limiting embodiment, an Information Handling System (IHS) may include: a processor; and an embedded controller (EC) coupled to the processor, where the EC can be configured to control an operating aspect of a cooling fan based, at least in part, upon a heat rejection or dissipation of a heatsink coupled to the processor.

In some embodiments, the heat rejection or dissipation of the heatsink comprises a heat rejection or dissipation of a surface of a fin of the heatsink. In other embodiments, the heatsink can be coupled to the processor through at least one of: a thermal conductor, or a heat pipe. In some embodiments, the EC can be configured to control the operating aspect of the cooling fan independently of any temperature measurement of the processor's silicon and electronic packaging. In some embodiments, the EC can be configured to calculate the heat rejection or dissipation of the heatsink based, at least in part, upon a temperature measurement collected by a sensor coupled to the heatsink.

In some embodiments, the EC can be configured to calculate the heat rejection or dissipation of the heatsink based, at least in part, upon a difference between the temperature measurement and an ambient temperature inside a chassis of the IHS. In some of these embodiments, to calculate the heat rejection or dissipation of the heatsink, the EC can be configured to: (i) divide the difference by a thermal resistance of the heatsink, or (ii) multiply the difference by a thermal conductance of the heatsink. In some embodiments, in order to control the operating aspect of the cooling fan, the EC can be configured to: (i) turn the cooling fan on, from an idle or off state, in response to the heat rejection or dissipation of the heatsink having risen to or above a first threshold value.

In some embodiments, in order to control the operating aspect of the cooling fan, the EC can be configured to signal a fan controller coupled to the cooling fan to set a rotation speed of the cooling fan to a first speed. In some of these embodiments, in order to control the operating aspect of the fan, the EC can be configured to signal the fan controller to increase the rotation speed of the cooling fan, from the first speed to a second speed greater than the first speed, at least in part, in response to the heat rejection or dissipation of the heatsink having risen to or above a second threshold value greater than the first threshold value. In some of these embodiments, in order to control the operating aspect of the fan, the EC can be configured to signal the fan controller to reduce the rotation speed of the cooling fan, from the second speed to the first speed, at least in part, in response to the heat rejection or dissipation of the heatsink having dropped below the second threshold value.

In some embodiments, in order to control the operating aspect of the cooling fan, the EC can be configured to send a signal to a fan controller coupled to the cooling fan to restrict an acoustic output of the cooling fan to a first loudness value. In other embodiments, in order to control the operating aspect of the fan, the EC can be configured to signal the fan controller to reduce the acoustic output restriction from the first loudness value to a second loudness value greater than the first loudness value, at least in part, in response to the heat rejection or dissipation of the heatsink having risen to or above a second threshold value greater than the first threshold value. In some embodiments, in order to control the operating aspect of the fan, the EC can be configured to signal the fan controller to increase the acoustic output restriction of the cooling fan from the second loudness value to the first loudness value, at least in part, in response to the heat rejection or dissipation of the heatsink having dropped below the second threshold value.

In some embodiments, a hardware memory can be integrated into, or coupled to, a controller, where the memory comprises instructions that, upon execution, cause the controller to: receive a heatsink temperature obtained from a sensor physically coupled to a heatsink, where the heatsink can be thermally coupled to a heat producing component; and modify a speed of a cooling fan based, at least in part, upon the heatsink temperature and independently of any temperature measurement of the heat producing component.

In some of these embodiments, the controller comprises at least one of: an Embedded Controller (EC), a Baseband Management controller (BMU), a chassis controller, or a fan controller, or the heat producing component. In some embodiments, in order to modify the speed of the fan, the instructions, upon execution, further cause the controller to: calculate a heat rejection or dissipation of the heatsink based, at least in part, upon a difference between the heatsink temperature and an ambient temperature, where the difference can be: (i) divided by a thermal resistance of the heatsink, or (ii) multiplied by a thermal conductance of the heatsink; and at least one of: in response to the heat rejection or dissipation having risen to or above a threshold value, increase the speed of the fan; or in response to the heat rejection or dissipation having dropped to or below the threshold value, reduce the speed of the fan.

In some embodiments, a method includes: calculating a heat rejection or dissipation of a heatsink coupled to a heat producing component of an Information Handling System (IHS) based, at least in part, by determining a difference between a heatsink temperature and an ambient temperature, and: (i) dividing the difference by a thermal resistance of the heatsink, or (ii) multiplying the difference by a thermal conductance of the heatsink; and adjusting a rotation speed of a fan configured to cool the heat producing component based, at least in part, upon the calculation.

In some of these embodiments, adjusting the rotation speed of the fan comprises: in response to the heat rejection or dissipation having risen to or above a threshold value, increasing the rotation speed of the fan; or in response to the heat rejection or dissipation having dropped to or below the threshold value, reducing the rotation speed of the fan. In some of these embodiments, adjusting the rotation speed of the fan comprises mapping a result of the calculation to a corresponding entry of a data structure that associates discrete levels of heat rejection or dissipation with at least one of: different rotation speeds, or different loudness levels.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Systems and methods of this application disclose smart power and fan speed control. Fan control of systems with large dynamic power is an ever-increasing challenge. Dynamic powers can scale to multiples of the thermal design power ("TDP"), which is the theoretical maximum amount of heat generated by a CPU or GPU that its cooling system is designed to dissipate. Therefore, the amount of instantaneous power can cause temperature swings beyond 30° C./s, and effectively remove the junction temperature as a proper mode for fan control (especially fan turn-on). Simply averaging the junction temperature to dampen the fan speed response is imprecise, and can cause early spin up of system fan without value. Therefore, some embodiments of the present disclosure provide a system and method that is focused on when to begin to ramp up the system fan. Some of these embodiments provide for a system and method that incorporates the energy storage potential of the heatsink and system.

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
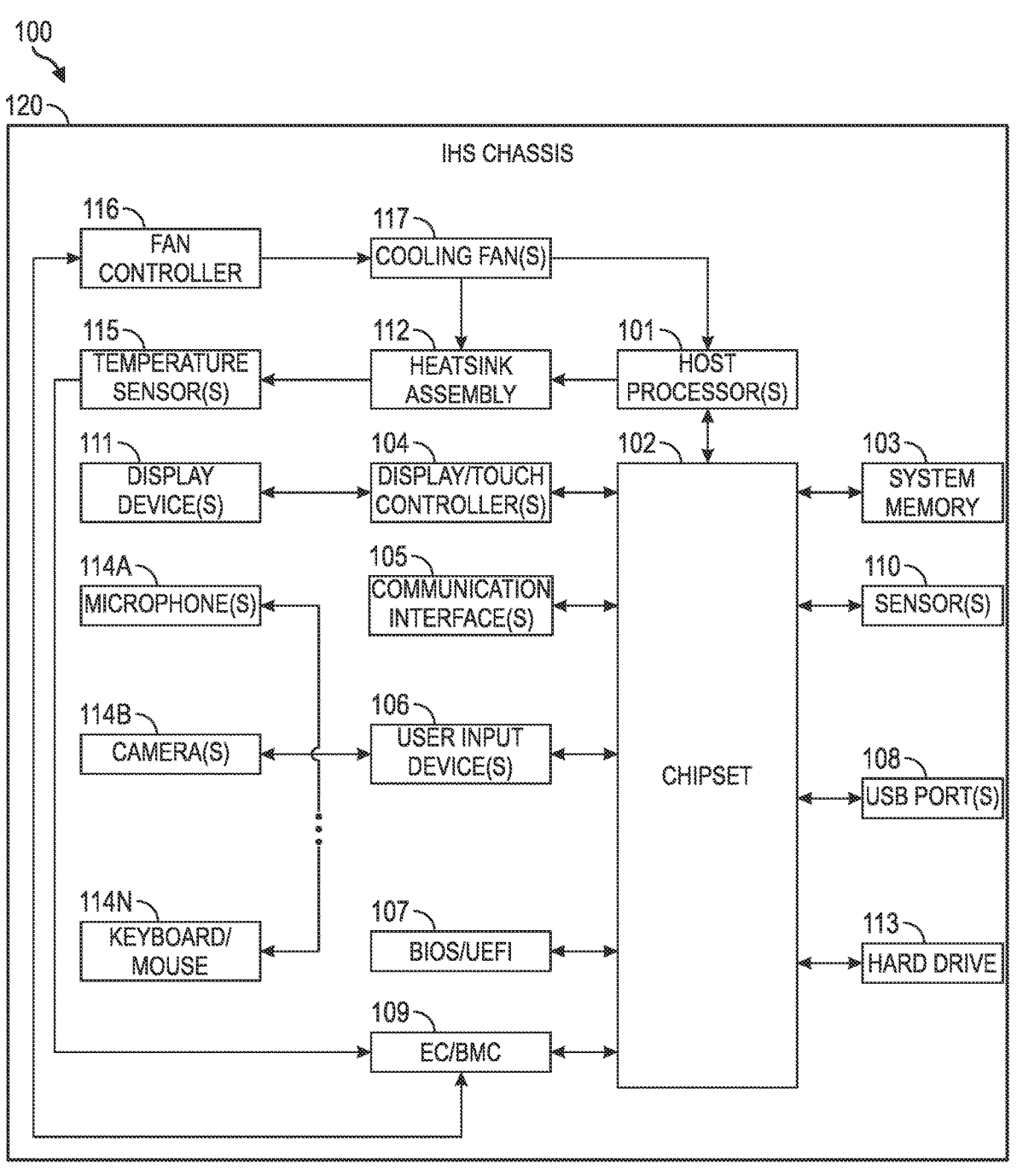
FIG. 1 is a diagram illustrating examples of hardware components of an Information Handling System (IHS), according to some embodiments.

FIG. 1 is a diagram illustrating examples of hardware components of an Information Handling System (IHS), according to some embodiments.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

The host processor(s) 101 can have a heatsink assembly 112 coupled (e.g. thermally coupled) and/or structurally attached to the host processor(s), in order to increase the heat flow away from a host processor(s). The heatsink assembly can accomplish this task by increasing the host processor's working surface area and the amount of lower-temperature air that moves across its enlarged surface area. In some embodiments, the heatsink assembly 112 has a fin structure. A fin of a heat sink may be considered to be a protrusion with heat flowing in one end and being dissipated into the surrounding air as it travels to the other. As heat flows through the fin, the combination of the thermal resistance of the heat sink impeding the flow and the heat lost due to convection, the temperature of the fin may decrease from the base to the end of the fin. A pin-fin heat sink is a heat sink that has pins that extend from its base. The pins can be cylindrical, elliptical or square. A second type of heat-sink fin arrangement is the straight fin. These run the entire length of the heat sink. A straight-fin heat sink can cut at regular intervals. A variation on the straight-fin heat sink is a cross-cut heat sink. Another configuration is the flared-fin heat sink, whose fins are not parallel to each other. Flaring the fins can decrease flow resistance and make more air go through the heat-sink fin channel. There can be other types of heatsink assembly 112 constructions and the embodiments described here should not be construed as limiting.

The IHS 100 can also include one or more cooling fan(s) 117 configured to cool down one or more components or devices of IHS 100 disposed inside a chassis, case, or housing. Cooling fan(s) 117 may include any fan inside, or attached to, IHS 100 and used for active cooling. Cooling fan(s) 117 may be used to draw cooler air into the case from the outside, expel warm air from inside, and/or move air across a heat sink to cool a particular IHS component. In various embodiments, either or both axial and/or centrifugal (blower/squirrel-cage) fans may be used. Other types of cooling fan(s) 117 can be used, and the types listed here should not be construed as limiting. The cooling fan(s) 117 can, in some embodiments, be designed to mainly cool the host processor(s) 101 and the accompanying heatsink assembly 112. The cooling fan(s) 117 can be controlled by a fan controller 116.

IHS 100 may also include chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113. Although labeled simply "hard drive" in FIG. 1, component 113 can refer to any type of hard disk drive, solid-state drive, optical drive, or other removable-media drive.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), receiving temperature readings from the temperature sensor(s) 115, and managing the fan controller 116.

For example, EC/BMC 109 may implement operations for interfacing with the fan controller 116 in managing the cooling fan(s) 117 for the heatsink assembly 112 and/or the host processor(s). Such operations may be performed to based on input provided by the temperature sensor(s) 115 that can measure the temperature of the heatsink assembly 112, as well as the ambient temperature of the air entering the heatsink assembly.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

Examples of information collected and stored in a memory within EC/BMC 109 may include, but are not limited to: operating conditions (e.g., cooling fan(s) 117 operating conditions including fan state information such as current fan speed and/or measured acoustic value of the fan speed in Sones (S); and/or IHS operating conditions such as processor operating speed data, system power management and cooling system settings, state of "system present" pin signal), or environmental or contextual information (e.g., such as ambient temperature, relative humidity, system geolocation measured by GPS or triangulation, time and date, etc.).

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Figure 2:
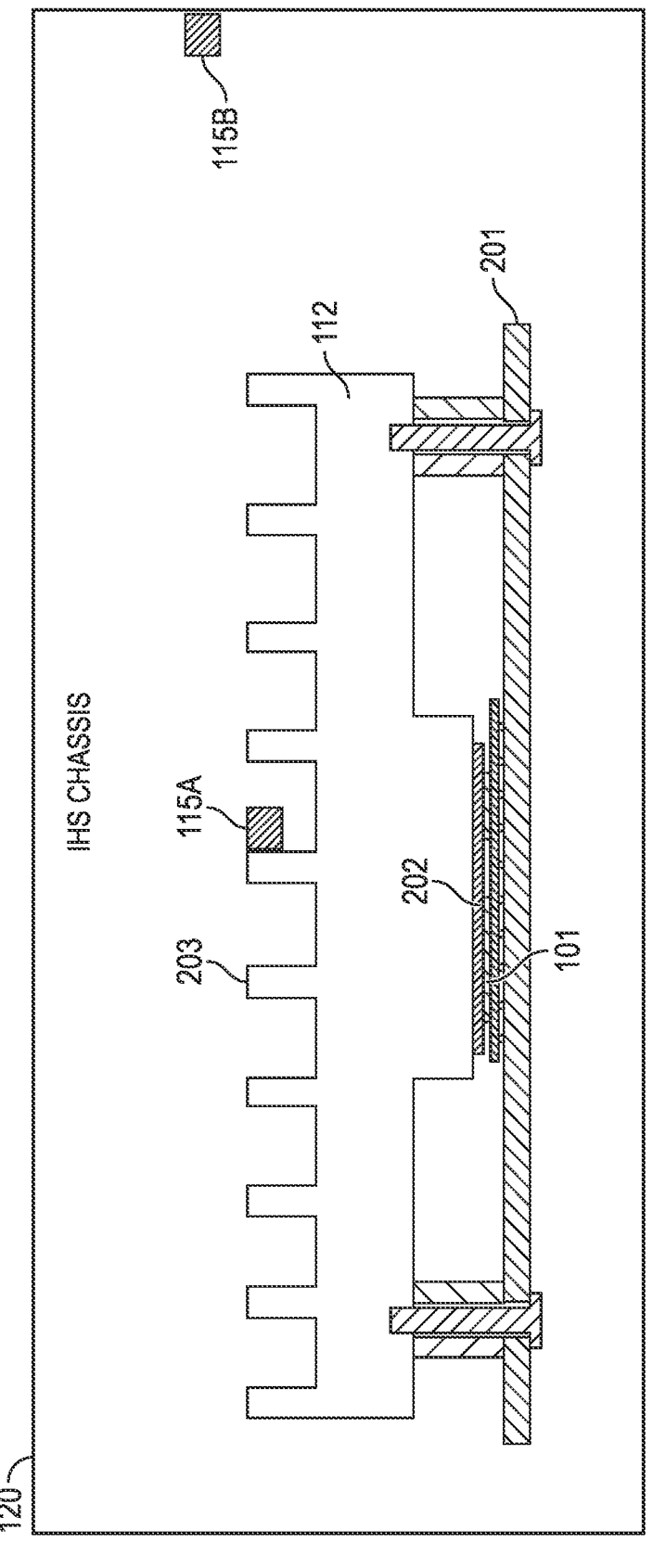
FIG. 2 is a cross-section view illustrating an example of a heat producing component thermally coupled to a heatsink, according to some embodiments.

FIG. 2 is a cross-section view illustrating an example of a heat producing component thermally coupled to a heatsink assembly 112, according to some embodiments. In some embodiments, the components of FIG. 2 are located within a chassis 120 of the IHS.

Heat dissipation is an unavoidable by-product of electronic devices and circuits. In general, the temperature of the device or component will depend on the thermal resistance from the component to the environment, and the heat dissipated by the heat producing component 101 and/or heatsink assembly 112. To ensure that the heat producing component 101 does not overheat, there can be an efficient heat transfer path from the device to the environment, in some embodiments.

The heat producing component can be the host processor(s) 101, in some embodiments. In other embodiments, the heat producing component can be any other type of electronic devices or circuit that produces heat. The heat producing component, such as the host processor(s) 101, can be mounted onto a mounting component 201 such as a circuit board. The circuit board that includes the host processor(s) 101 of an IHS can sometimes be called the "motherboard." In some embodiments the host processor(s) 101 can be mounted onto a mounting component 201 using a heat insulating material such that the heat from the host processor(s) is limited in transferring to the mounting component 201, such as the motherboard.

As power dissipation of components increases and component package size decreases, thermal engineers must innovate to ensure components won't overheat. Devices that run cooler last longer. A heatsink assembly 112 design can fulfill both thermal as well as its mechanical requirements. Concerning the former, the heatsink assembly 112 can be thermally coupled to the heat producing component, such as the host processor(s) 101. Concerning the latter, the heatsink assembly 112 can, in some embodiments, remain in thermal contact with its heat producing component 101 with reasonable shock and vibration. The heatsink assembly 112 can be mounted onto either the heat producing component 101 or the mounting component 201, or both, depending on the embodiment. In some embodiments, the heatsink assembly can be thermally coupled to the heat producing component through a heat pipe. Attachment methods can include using some kind of attachment component 202, such thermally conductive tape or epoxy, wire-form z clips, flat spring clips, standoff spacers, push pins with ends that expand after installing, and/or heat pipes depending on the embodiment. Attachment methods or components can include any method and/or component that allows the heatsink assembly 112 to be thermally coupled to the heat producing component, and the methods or components listed here should not be construed as limiting.

In some embodiments, the attachment component 202 can be thermally conductive tape, which can be one of the most cost-effective heat sink attachment materials. It can be suitable for low-mass heat sinks and for components with low power dissipation. It can consist of a thermally conductive carrier material with a pressure-sensitive adhesive on each side, for example. This tape can be applied to the base of the heat sink, which is then attached to the component.

In some embodiments, the attachment component 202 can be epoxy. Epoxy can be more expensive than tape, but can provide a greater mechanical bond between the heat sink and component, as well as improved thermal conductivity. Epoxies can be two-part liquid formulations that must be thoroughly mixed before being applied to the heat sink, and before the heat sink is placed on the component. The epoxy can then be cured for a specified time, which can vary, usually from 2 hours to 48 hours. The epoxy bond between the heat sink and component can be semi-permanent or permanent, in some embodiments.

In some embodiments, the attachment component 202 can be wire form z-clips. Wire form z-clips can attach to heatsinks mechanically. To use the z-clips, the mounting component 201, such as the printed circuit board, can have anchors. Anchors can be soldered onto the board, or pushed through, or somehow otherwise attached. To assemble with a z-clip, one side of it can be attached to one of the anchors. The spring can be deflected until the other side of the clip can be placed in the other anchor. The deflection can develop a spring load on the component, which can maintain a very good contact. In addition to the mechanical attachment that the z-clip provides, it can also permit using higher-performance thermal interface materials, in some embodiments.

In some embodiments, the attachment component 202 can be clips. The clips can be available for processors or ball grid array (BGA) components. Clips can allow the attachment of a BGA heat sink directly to the component. The clips can make use of the gap created by the BGA between the component underside and mounting component 201 top surface. The clips may therefore require no holes in the mounting component. Clips can allow for easy rework of components.

In some embodiments, the attachment component 202 can be push pins with compression springs. The push pins, typically made of brass or plastic, can have a flexible barb at the end that engages with a hole in the mounting component. Once installed, the barb retains the pin. The compression spring can hold the assembly together and maintains contact between the heat sink and component.

In some embodiments, the attachment component 202 can be threaded standoffs with compression springs. A threaded standoff can be a hollow metal tube with internal threads. One end is secured with a screw through a hole in the PCB. The other end can accept a screw which compresses the spring, completing the assembly. A typical heat sink assembly uses two to four standoffs, which tends to make this the costliest heat sink attachment design.

In some embodiments, the attachment component 202 can be a heat pipe. A heat pipe is a heat-transfer device that employs phase transition to transfer heat between two solid interfaces. At the hot interface of a heat pipe, in some embodiments, a volatile liquid in contact with a thermally conductive solid surface turns into a vapor by absorbing heat from that surface. The vapor then travels along the heat pipe to the cold interface and condenses back into a liquid, releasing the latent heat. The liquid then returns to the hot interface through either capillary action, centrifugal force, or gravity and the cycle repeats. Due to the very high heat transfer coefficients for boiling and condensation, heat pipes can be highly effective thermal conductors, in some embodiments.

In some embodiments, the heatsink assembly 112 has a fin structure with a plurality of fins 203. A fin 203 of a heatsink 112 may be considered to be a protrusion with heat flowing in one end and being dissipated into the surrounding air as it travels to the other. As heat flows through the fin, the combination of the thermal resistance of the heat sink impeding the flow and the heat lost due to convection, the temperature of the fin may decrease from the base to the end of the fin. A pin-fin heat sink is a heat sink that has pins that extend from its base. The pins can be cylindrical, elliptical or square. A second type of heat-sink fin arrangement is the straight fin. These run the entire length of the heat sink. A straight-fin heat sink can cut at regular intervals. A variation on the straight-fin heat sink is a cross-cut heat sink. Another configuration is the flared-fin heat sink, whose fins are not parallel to each other. Flaring the fins can decrease flow resistance and make more air go through the heat-sink fin channel. There can be other types of heatsink assembly 112 constructions and the embodiments described here should not be construed as limiting.

The system can also include a plurality of sensors (115A, 115B) to measure temperature. The embodiment depicted in FIG. 2 depicts two sensors. The sensors (115A, 115B) can be any temperature measuring device, such as a thermocouple, thermistor, thermometer, etc. The sensors can be, for example, clip-on sensors, dedicated flywires, and/or integrated sensors, depending on the embodiment. Other types of sensors can be used, and the types of sensors listed should not be construed as limiting. The first sensor 115A can measure the temperature of a fin 203 of the heatsink assembly 112. The temperature reading that the first sensor 115A produces can be called $T_{fin}$. The second sensor 115B can measure the temperature of the air entering the finstack of the heatsink assembly 112. This temperature reading that the second sensor 115B produces can be called the ambient temperature, or $T_{ambient}$, according to some embodiments. The $T_{ambient}$ can be computed by a second sensor, or can be correlated based upon the $\Delta T$ rise in temperature through the system, depending on the embodiment.

Figure 3:
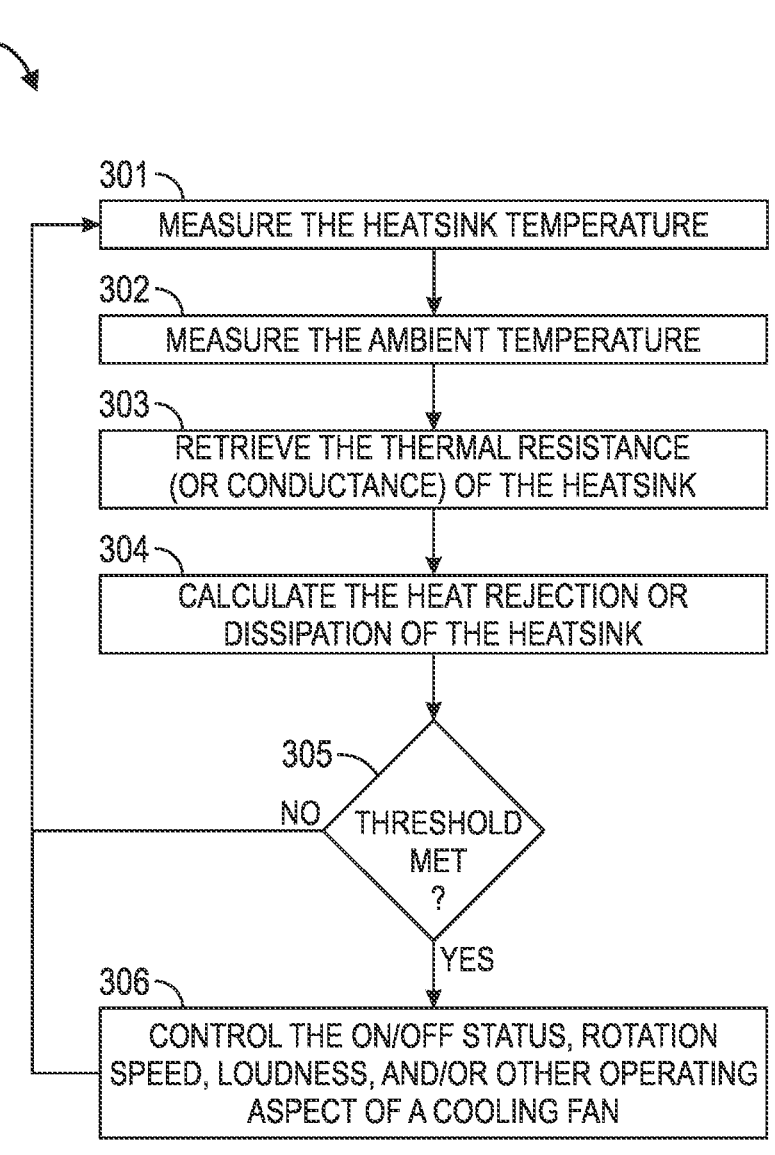
FIG. 3 is a flowchart illustrating an example of a method for smart power and fan speed control, according to some embodiments.

FIG. 3 is a flowchart illustrating an example of a method for smart power and fan speed control. In some embodiments, the control of the fan can be based, at least in part, on the energy rejection performance of the heatsink itself, independently of any temperature measurement of the heat producing component. Instead of basing the fan speed solely on the temperature of a device, the fan speed control can instead be based on a measured value that is based upon the heat rejection from the surface of the heatsink and/or fins. Therefore, these embodiments can use the temperature of the heatsink's fin $T_{fin}$, and not the junction temperature $T_j$, in determining the control of the fan. These embodiments can obtain the temperature of a fin $T_{fin}$, the ambient temperature of air around the finstack $T_{ambient}$, and the thermal resistance of the heatsink assembly and/or finstack, in order to determine how much heat is being rejected from the finstack at that point in time.

Some embodiments of the method for smart power and fan speed control can compute a control variable Q. Q is not $T_j$. Q can be the power rejected from the heatsink's finstack in Watts (W). Q can be determined by the following equation, in some embodiments:

$$Q_{(Watts)} = \frac{T_{fin} - T_{ambient}}{R_{(^\circ C./Watt)}} \qquad \text{(Equation 1)}$$

Therefore, Q can be determined, in some embodiments, by measuring the fin temperature of the heatsink $T_{fin}$, and measuring or determining the ambient temperature of the air around the finstack $T_{ambient}$, such as the intake air to the finstack. For example, air temperature around an IHS can be 28° C. However, there can be a 10° C. rise to the finstack. Therefore, the air entering the finstack, or $T_{ambient}$, would be 38° C., not 28° C. The $T_{fin}$ can be subtracted from the $T_{ambient}$ to determine the temperature difference of the finstack to its surrounding air. This temperature difference can be divided by the thermal resistance R, in some embodiments. The thermal resistance R can be the heat rejection capability of the heatsink, and is measured in degrees C. per Watt (° C./Watt). Therefore, the resulting parameter can be Q, which is the power rejected from the heatsink's finstack in Watts (W). In other embodiments, the temperature difference can be multiplied by a thermal conductance of the heatsink.

The thermal resistance R (or thermal conductance) can be determined by characterizing the heatsink at sometime previous to the assembly of the IHS, in some embodiments. The heatsink can be characterized through testing, experimentation, and/or simulation, in some embodiments. The heatsink can be characterized at different fan speeds to determine different R values for different fan speeds. Therefore, multiple thermal resistances (R values) of the heatsink can be determined at multiple fan speeds, including when the fan is off. These multiple determined thermal resistances can be pre-loaded into an embedded controller (EC), such as an EC/BMC (109), for the EC to use in determining Q, in some embodiments. To determine Q, $T_{fin}$ and $T_{ambient}$ are measured, the thermal resistance R is retrieved from memory or storage, and then Q is calculated using these parameters, in some embodiments.

Once Q is determined, then Q can be used to determine the fan speed control. For example, the fan can be turned on when the power rejected from the heatsink's finstack meets a critical threshold in power (e.g. 3 W). Once on, the control parameter Q can used to determine system fan speed. Fan speed control can be a step function, or linear, or based on other control methodologies, depending on the embodiment, and the control methodologies described here should not be construed as limiting. In the embodiments of a step function, then the following lists an example of steps that can be employed for fan speed control:

Step 0: Q<4 W, then fan is off.
Step 1: Q≥4 W, then fan=2000 rpm
Step 2: Q≥10 W, then fan=4000 rpm
Step 3: Q≥15 W, then fan=6000 rpm
Step 4: Q<15 W, then fan=4000 rpm
Step 5: Q<10 W, then fan=2000 rpm Therefore, an embedded controller (EC), such as an EC/BMC (109), can control an operating aspect of a cooling fan based, at least in part, upon a heat rejection or dissipation of a heatsink coupled to the processor, independently of any temperature measurement of the heat producing component. The EC can be configured to signal a fan controller coupled to the cooling fan to set a rotation speed of the cooling fan to a first speed. For example, as step 1 above indicates, the EC can signal a fan controller to set a rotation speed of the cooling fan to 2000 rpm, when Q reaches a threshold of 4 W. The EC might be configured to have the fan remain at this rotation speed for a certain period of time (e.g. 30 seconds), in some embodiments.

In addition, the EC can further be configured to signal the fan controller to increase the rotation speed of the cooling fan, from the first speed to a second speed greater than the first speed, in response to the heat rejection or dissipation of the heatsink having risen to or above a second threshold value greater than the first threshold value. For example, as step 2 above indicates, the EC can signal a fan controller to set a rotation speed of the cooling fan to 4000 rpm, when Q reaches a threshold of 10 W. The EC might be configured to have the fan remain at this rotation speed for a certain period of time (e.g. 30 seconds), in some embodiments.

In addition, the EC can further be configured to signal the fan controller to reduce the rotation speed of the cooling fan, from the second speed to the first speed, in response to the heat rejection or dissipation of the heatsink having dropped to or below the second threshold value. For example, as step 5 above indicates, the EC can signal a fan controller to set a rotation speed of the cooling fan back to 2000 rpm, when Q drops below the second threshold of 10 W.

Therefore, the method for smart power and fan speed control can provide a more delayed increase in fan speed than previously, in some embodiments. This has a benefit of decreasing the overall noise of the fans and, consequently, the overall noise of the IHS. Instead of fans ramping up to a high speed very quickly as the temperature of the heat producing device increases, i.e. within seconds, this method for smart power and fan speed control can increase the fan speed more slowly, i.e. within minutes. With these embodiments, the fans might not need to increase to the maximum speed, and might not even need to turn on at all. The overall noise of these embodiments can be significantly lower than previously.

Therefore, these embodiments can provide a lower acoustic noise per power rejected from the heatsink. Acoustic noise can be measured in Sones (S). Sones are a measurement of sound, similar to decibels. The difference between sones and decibels is that sones are linear, where decibels are logarithmic. This means that 1.0 sone is exactly half as loud as 2.0 sones, and 2.0 sones is half as loud as 4.0 sones. Therefore, Sones (S) can be a better measurement of sound for fans of IHSs than decibels. Therefore, these embodiments can provide a lower Sones per Watt (S/W) than previously.

Instead of an EC being configured to signal a fan controller to set a rotation speed of the cooling fan, the EC, in some embodiments, can instead signal a fan controller to restrict the acoustic output of a fan to a loudness value. The acoustic output can be restricted based upon a heat rejection or dissipation of a heatsink coupled to the processor, independently of any temperature measurement of the heat producing component. In the embodiments of a step function, then the following lists an example of steps that can be employed to restrict the acoustic output of a fan:

Step 0: Q<4 W, then fan is off.
Step 1: Q≥4 W, then fan loudness=0.4 S
Step 2: Q≥10 W, then fan loudness=0.8 S
Step 3: Q≥15 W, then fan loudness=1.1 S
Step 4: Q<15 W, then fan loudness=0.8 S
Step 5: Q<10 W, then fan loudness=0.4 S The EC can therefore be configured to instead send a signal to a fan controller coupled to the cooling fan to restrict the acoustic output of the cooling fan to a first loudness value. For example, as step 1 above indicates, the EC can signal a fan controller to set a loudness value of the cooling fan to 0.4 S, when Q reaches a threshold of 4 W. The EC might be configured to have the fan remain at this loudness value for a certain period of time (e.g. 30 seconds), in some embodiments.

In addition, the EC can be further configured to signal the fan controller to reduce the acoustic output restriction from the first loudness value to a second loudness value greater than the first loudness value, in response to the heat rejection or dissipation of the heatsink having risen to or above a second threshold value greater than the first threshold value. For example, as step 2 above indicates, the EC can signal a fan controller to set a loudness value of the cooling fan to 0.8 S, when Q reaches a threshold of 10 W.

In addition, the EC can be further configured to signal the fan controller to increase the acoustic output restriction of the cooling fan from the second loudness value to the first loudness value, in response to the heat rejection or dissipation of the heatsink having dropped below the second threshold value. For example, as step 5 above indicates, the EC can signal a fan controller to set a loudness value of the cooling fan back to 0.4 S, when Q drops below the second threshold of 10 W.

FIG. 3 illustrates an example of this method for smart power and fan speed control, according to some embodiments. FIG. 3 begins at 301 which measures the heatsink temperature. This heatsink temperature can be the temperature of a fin of the heatsink, or $T_{fin}$, in some embodiments. The flowchart then transitions to 302 which measures the ambient temperature. This ambient temperature can be the temperature of the air entering the finstack, or $T_{ambient}$, in some embodiments. The flowchart then transitions to block 303 which retrieves the thermal resistance (or conductance) of the heatsink. This can be the thermal resistance R, or the heat rejection capability of the heatsink, in some embodiments.

The flowchart then transitions to block 304 which calculates the heat rejection or dissipation of the heatsink. This calculated parameter can be Q, which is the power rejected from the heatsink's finstack in Watts (W). Q can be calculated using equation 1, in some embodiments. In other embodiments, instead of dividing the temperature difference by the thermal resistance, the temperature difference can instead be multiplied by a thermal conductance of the heatsink. The flowchart then transitions to 305 which determines whether or not a threshold is met. For example, this block can determine whether the power rejected from the heatsink's finstack (e.g. Q) meets a threshold in power. If the threshold is not met, then the flowchart returns to block 301. If, on the other hand, the threshold is met, then the flowchart transitions to block 306 which controls the on/off status, rotation speed, loudness, and/or other operating aspect of a cooling fan. After performing the actions of block 306, the flowchart returns to block 301.

Figure 4:
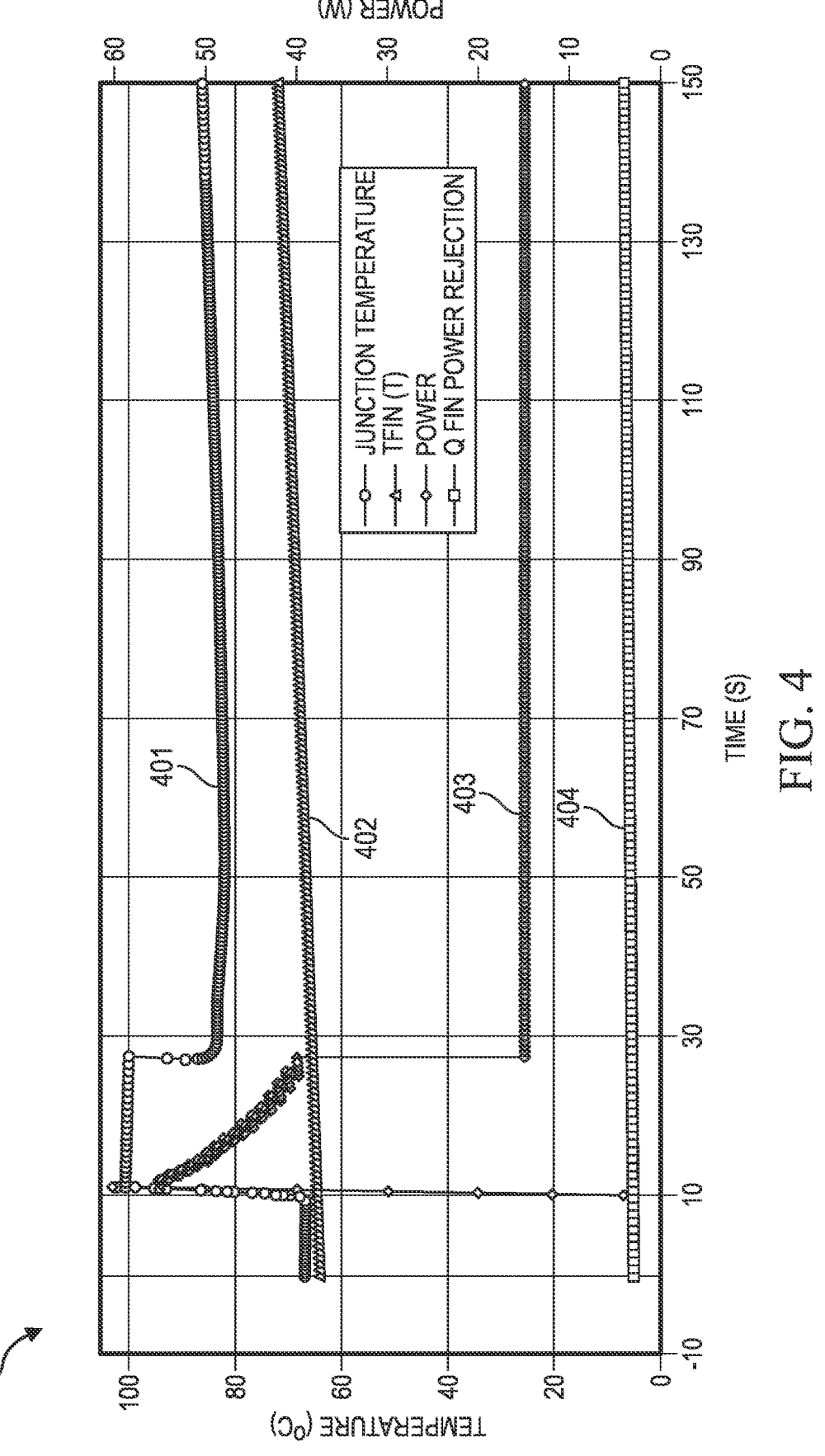
FIG. 4 is a graph illustrating an implementation example, according to some embodiments.

FIG. 4 is a graph illustrating an implementation example, according to some embodiments. The graph depicts different temperature and power related parameters for an embodiment of a heat producing component thermally coupled to a heatsink assembly. FIG. 4 depicts that as power (403) is applied to a heat producing device, such as one or more host processors 101, then the temperature of the device or the junction temperature $T_j$ (401) has a very fast time response. Junction temperature, in some embodiments, can be called transistor junction temperature. In these embodiments, the junction temperature can be the highest operating temperature of the actual semiconductor in an electronic device. In operation, the junction temperature can be higher than case temperature and the temperature of the part's exterior.

However, while the junction temperature 401 has a very fast time response as power (403) is applied to the heat producing component (such as one or more host processors 101) the temperature of the finstack, $T_{fin}$, has a much slower time response. FIG. 4 discloses that power 403 to increases from below 5 W to near 62 W almost instantaneously at around the 10 second mark. For example, for a 15 W CPU with turbo there can be very short-term bursts in power to around 62 W. When 62 W (403) is applied to a heat producing component made primarily of silicon, the typical temperature response of the silicon response $T_j$ is shown in line 401. $T_j$ 401 rises to 100° C. very quickly, which is the maximum temperature of the silicon, just after 10 seconds (s). At this time, then other mechanisms can be employed to ensure that the junction temperature does not go over 100%. These mechanisms can be reducing the operating speed of the heat producing component, and/or putting the heat producing component in a lower power mode, for example.

While $T_j$ rises to 100° C. very quickly, the temperature of the fins of the heatsink assembly $T_{fin}$ 402 stays just above 60° C. for a significant amount of time. Therefore, in this embodiment, while $T_j$ 401 becomes hot very quickly at around 10 s and then cools as soon as the power 403 is dissipated just before 30 s, $T_{fin}$ 402 isn't even heated significantly during this time. Therefore, there is very little heat rejection taking place from the heatsink's finstack during the first few seconds after the power increases significantly at around 10 s. However, some fan control mechanisms increase the speed of the fan from minimum to maximum over the time domain where the junction temperature 401 reaches 100° C. However, if the fan speed is increased during this time, very little additional heat is being dissipated. Instead, the fan acoustics have increased while very little heat is being dissipated from the finstack.

Therefore, some embodiments use the temperature of the heatsink's fin $T_{fin}$, and not the junction temperature $T_j$, in determining the control of the fan. The fanspeed can be determined based upon the power being rejected from the system itself through the finstack independently of any temperature measurement of the heat producing component, in these embodiments. The bottom line in FIG. 4 is the power rejected through the finstack, or $Q_{fin}$ power rejected in Watts (W) 404. $Q_{fin}$ power rejected (W) 404 is very low initially at around the 10 s mark, and then slowly ramps up as time increases. Based on this $Q_{fin}$ power rejected (W) 404, the fan might not need to be turned on until 50 s, for example. Once the $Q_{fin}$ power rejected (W) 404 reaches a threshold, for example somewhere between 3 W-4 W, then at that point the fan might be turned on and/or increased. At that point, then there is a greater benefit of turning fans on, and increasing speed of fans, based on the temperature of the fin ($T_{fin}$ 402) itself.

Each IHS system can be variable from another IHS system based on the characteristics of the IHS. For example, a 30 mm finstack, a 50 mm finstack, one fans, two fans, or 4 fans can provide different thermal capacitances and resistances with the fan off, and at different fan speeds. However, the method for smart power and fan speed control discussed with regard to FIG. 3 takes into account most if not all of these parameters, in some embodiments.

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a processor; and
an embedded controller (EC) coupled to the processor, wherein the EC is configured to control an operating aspect of a cooling fan based, at least in part, upon a heat rejection or dissipation of a heatsink coupled to the processor;
wherein the EC is configured to calculate the heat rejection or dissipation of the heatsink based, at least in part, upon a difference between a temperature measurement collected by a first sensor coupled to the heatsink and an ambient temperature inside a chassis of the IHS, and wherein the ambient temperature is collected by a second sensor physically separated from the heatsink by a distance.

2. The IHS of claim 1, wherein the heat rejection or dissipation of the heatsink comprises a heat rejection or dissipation of a surface of a fin of the heatsink.

3. The IHS of claim 1, wherein the heatsink is coupled to the processor through at least one of: a thermal conductor, or a heat pipe.

4. The IHS of claim 1, wherein the EC is configured to control the operating aspect of the cooling fan independently of any temperature measurement of the processor's silicon and electronic packaging.

5. The IHS of claim 1, wherein to calculate the heat rejection or dissipation of the heatsink, the EC is configured to: (i) divide the difference by a thermal resistance of the heatsink, or (ii) multiply the difference by a thermal conductance of the heatsink.

6. The IHS of claim 1, wherein to control the operating aspect of the cooling fan, the EC is configured to: (i) turn the cooling fan on, from an idle or off state, in response to the heat rejection or dissipation of the heatsink having risen to or above a first threshold value.

7. The IHS of claim 1, wherein to control the operating aspect of the cooling fan, the EC is configured to signal a fan controller coupled to the cooling fan to set a rotation speed of the cooling fan to a first speed.

8. The IHS of claim 7, wherein to control the operating aspect of the cooling fan, the EC is configured to signal the fan controller to increase the rotation speed of the cooling fan, from the first speed to a second speed greater than the first speed, at least in part, in response to the heat rejection or dissipation of the heatsink having risen to or above a second threshold value greater than a first threshold value.

9. The IHS of claim 8, wherein to control the operating aspect of the cooling fan, the EC is configured to signal the fan controller to reduce the rotation speed of the cooling fan, from the second speed to the first speed, at least in part, in response to the heat rejection or dissipation of the heatsink having dropped below the second threshold value.

10. The IHS of claim 1, wherein to control the operating aspect of the cooling fan, the EC is configured to send a signal to a fan controller coupled to the cooling fan to restrict an acoustic output of the cooling fan to a first loudness value.

11. The IHS of claim 10, wherein to control the operating aspect of the cooling fan, the EC is configured to signal the fan controller to reduce the acoustic output restriction from the first loudness value to a second loudness value greater than the first loudness value, at least in part, in response to the heat rejection or dissipation of the heatsink having risen to or above a second threshold value greater than a first threshold value.

12. The IHS of claim 11, wherein to control the operating aspect of the cooling fan, the EC is configured to signal the fan controller to increase the acoustic output restriction of the cooling fan from the second loudness value to the first loudness value, at least in part, in response to the heat rejection or dissipation of the heatsink having dropped below the second threshold value.

13. A non-transitory hardware memory integrated into, or coupled to, a controller, wherein the memory comprises instructions that, upon execution, cause the controller to:

receive a heatsink temperature obtained from a first sensor physically coupled to a heatsink, wherein the heatsink is thermally coupled to a heat producing component;

receive an ambient temperature obtained from a second sensor physically separated from the heatsink by a distance; and modify a speed of a cooling fan based, at least in part, upon a difference between the heatsink temperature and the ambient temperature, and independently of any temperature measurement of the heat producing component.

14. The non-transitory hardware memory of claim 13, wherein the controller comprises at least one of: an Embedded Controller (EC), a Baseband Management controller (BMU), a chassis controller, a fan controller, or the heat producing component.

15. The non-transitory hardware memory of claim 13, wherein to modify the speed of the cooling fan, the instructions, upon execution, further cause the controller to:

calculate a heat rejection or dissipation of the heatsink based, at least in part, upon the difference between the heatsink temperature and an ambient temperature, wherein the difference is: (i) divided by a thermal resistance of the heatsink, or (ii) multiplied by a thermal conductance of the heatsink; and at least one of:

in response to the heat rejection or dissipation having risen to or above a threshold value, increase the speed of the cooling fan; or in response to the heat rejection or dissipation having dropped to or below the threshold value, reduce the speed of the cooling fan.

16. A method, comprising:

calculating a heat rejection or dissipation of a heatsink coupled to a heat producing component of an Information Handling System (IHS) based, at least in part, by determining a difference between a heatsink temperature and an ambient temperature, wherein the heatsink temperature is obtained from a first sensor physically coupled to the heatsink, and wherein the ambient temperature is obtained from a second sensor physically separated from the heatsink by a distance; and adjusting a rotation speed of a fan configured to cool the heat producing component based, at least in part, upon the calculation.

17. The method of claim 16, wherein adjusting the rotation speed of the fan comprises:

in response to the heat rejection or dissipation having risen to or above a threshold value, increasing the rotation speed of the fan; or in response to the heat rejection or dissipation having dropped to or below the threshold value, reducing the rotation speed of the fan.

18. The method of claim 17, wherein adjusting the rotation speed of the fan comprises mapping a result of the calculation to a corresponding entry of a data structure that associates discrete levels of heat rejection or dissipation with at least one of: different rotation speeds, or different loudness levels.

19. The IHS of claim 1, wherein to control the operating aspect of the cooling fan, the EC is configured to:

in response to the heat rejection or dissipation having risen to or above a threshold value, increase a rotation speed of the cooling fan; or in response to the heat rejection or dissipation having dropped to or below the threshold value, reduce the rotation speed of the cooling fan.

* * * * *